US008625986B2

(12) United States Patent
Skoog et al.

(10) Patent No.: US 8,625,986 B2
(45) Date of Patent: Jan. 7, 2014

(54) METHODS AND SYSTEMS FOR OPTICAL PERFORMANCE MONITORING

(75) Inventors: Ronald A. Skoog, Shrewsbury, NJ (US); Thomas Clyde Banwell, Howell, NJ (US); Haim Kobrinski, Colts Neck, NJ (US); Sarry Habiby, Middletown, NJ (US); Joel W. Gannett, Atlantic Highlands, NJ (US); Russell Fischer, Bernardsville, NJ (US)

(73) Assignee: TTI Inventions A LLC, Wilmington, DE (US)

( * ) Notice: Subject to any disclaimer, the term of this patent is extended or adjusted under 35 U.S.C. 154(b) by 2000 days.

(21) Appl. No.: 11/527,618

(22) Filed: Sep. 27, 2006

(65) Prior Publication Data

US 2008/0075457 A1    Mar. 27, 2008

(51) Int. Cl.
*H04B 10/08* (2011.01)
(52) U.S. Cl.
USPC .................................. 398/26; 398/28; 398/29
(58) Field of Classification Search
USPC ..................................................... 398/17–28
See application file for complete search history.

(56) References Cited

U.S. PATENT DOCUMENTS

| 6,396,601 | B1 * | 5/2002 | Takara et al. ...................... 398/9 |
| 6,760,676 | B2 * | 7/2004 | Nygaard, Jr. ...................... 702/79 |
| 6,934,647 | B2 * | 8/2005 | MacDonald ...................... 702/66 |
| 7,190,752 | B2 * | 3/2007 | Shake et al. ...................... 375/355 |
| 7,200,328 | B2 * | 4/2007 | Shake et al. ...................... 398/10 |
| 7,295,604 | B2 * | 11/2007 | Cranford et al. .............. 375/226 |
| 7,769,110 | B2 * | 8/2010 | Momtaz ......................... 375/317 |
| 7,899,324 | B2 * | 3/2011 | Anderson et al. ................ 398/25 |
| 8,139,952 | B2 * | 3/2012 | Nelson et al. .................. 398/182 |
| 2003/0011837 | A1 * | 1/2003 | Shake et al. .................... 359/110 |
| 2005/0078188 | A1 * | 4/2005 | Cho et al. ...................... 348/192 |
| 2005/0117916 | A1 * | 6/2005 | Kropp et al. ................... 398/202 |
| 2005/0163439 | A1 * | 7/2005 | Vanniasinkam et al. ........ 385/93 |
| 2006/0171485 | A1 * | 8/2006 | Laturell et al. ................ 375/296 |
| 2006/0256892 | A1 * | 11/2006 | Momtaz ......................... 375/317 |
| 2007/0064236 | A1 * | 3/2007 | Kartalopoulos .............. 356/450 |
| 2007/0206954 | A1 * | 9/2007 | Fishman et al. .............. 398/159 |
| 2007/0248357 | A1 * | 10/2007 | Fediakine et al. .............. 398/27 |
| 2007/0274628 | A1 * | 11/2007 | Hayee et al. .................... 385/24 |
| 2007/0286612 | A1 * | 12/2007 | Kuwata et al. ................ 398/208 |
| 2008/0075457 | A1 * | 3/2008 | Skoog et al. ..................... 398/9 |
| 2009/0175629 | A1 * | 7/2009 | Liu et al. ....................... 398/147 |

(Continued)

OTHER PUBLICATIONS

Weinert, Gaussian deconvolution method for identification of impairments in optical signal transmission, May 7, 2004, Fraunhofer-Institut of Telecommunications.*

(Continued)

*Primary Examiner* — Nathan Curs
*Assistant Examiner* — Tanya Ngo

(57) ABSTRACT

A method and system to economically monitor an optical OOK signal that can detect perceptible changes in signal quality and identify the type of optical impairment causing the change. The invention requires a new and novel combination of known techniques to create an eye diagram of the transmitted pulse in a wavelength division multiplexing systems and then removing the noise from the eye diagram. Economy of operation is achieve by using asynchronous sampling techniques for generating the eye diagram. The resulting "cleaner" eye diagram is then analyzed to identify any changes in performance. In the preferred embodiment, the analysis is conducted on histograms generated from eye diagram, the histograms are computed at a number of points across the optical signal pulse period.

19 Claims, 3 Drawing Sheets

Comparison of Chromatic Dispersion and Crosstalk Eye Diagrams

(56) References Cited

U.S. PATENT DOCUMENTS

| | | | |
|---|---|---|---|
| 2010/0097087 A1* | 4/2010 | Hogeboom et al. | 324/763 |
| 2010/0239244 A1* | 9/2010 | Nelson et al. | 398/25 |
| 2011/0135299 A1* | 6/2011 | Skoog et al. | 398/25 |
| 2013/0011133 A1* | 1/2013 | Skoog et al. | 398/25 |

OTHER PUBLICATIONS

Chen et al. "Transparent Monitoring of Rise Time Using Asynchronous Amplitud Histogram in Optical Transmission System", Jul. 2004, Journal of Lightwave Technology, vol. 22, No. 7, pp. 1661-1667.*

Shake et al, "Simple Measurement of Eye Diagram and BER using High-Speed Asynchronous Sampling", May 2004, Journal of Lightwave Technology, vol. 22, No. 5, pp. 1296-1302.*

N. Hanik et al "Application of Amplitude histograms to monitor performance of optical channels" Mar. 4, 1999, Electronic Letters, vol. 3, No. 5., pp. 403-404.*

D.C. Kilper et al., "Optical Performance Monitoring," Journal of Lightwave Technology, vol. 22, No. 1, Jan. 2004, pp. 294-304.

I. Shake et al., "Simple Measurment of Eye Diagram and BER Using High-Speed Asynchronous Sampling," Journal of Lightwave Technology, vol. 22, No. 5, May 2004, pp. 1296-1302.

I. Shake et al., "Chromatic Dispersion Dependence of Asynchronous Amplitude Histogram Evaluation of NRZ Signal," Journal of Lightwave Technology, vol. 21, No. 10, Oct. 2003, pp. 2154-2161.

Weinert, C. M., "Gaussian deconvolution method for identification of impairments in optical signal transmission," Journal of Optical Networking, vol. 3, No. 6, Jun. 2004, pp. 381-387.

H. Chen et al., "Transparent Monitoring of Rise Time Using Asychronous Amplitude Histograms in Optical Transmission Systems," Journal of Lightwave Technology, vol. 22, No. 7, Jul. 2004, pp. 1661-1667.

S. Wielandy et al., "Optical Performance Monitoring Using Nonlinear Detection," Journal of Lightwave Technology, vol. 22, No. 3, Mar. 2004, pp. 784-793.

N. Hanik et al., "Application of amplitude histograms to monitor performance of optical channels," Electronic Letters, vol. 35, No. 5, Mar. 1999, pp. 403-404.

International Telecommunication Union, ITU-T Recommendation G.697, Series G: Transmission Systems and Media, Digital Systems and Networks, Jun. 2004.

International Telecommunication Union, ITU-T Recommendation O.201, Series O: Specifications of Measuring Equipment, Jul. 2003.

* cited by examiner

Figure 1 Block Diagram of OPM
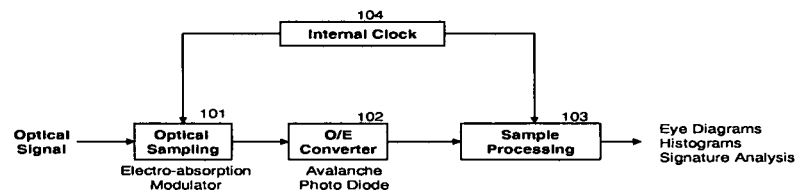

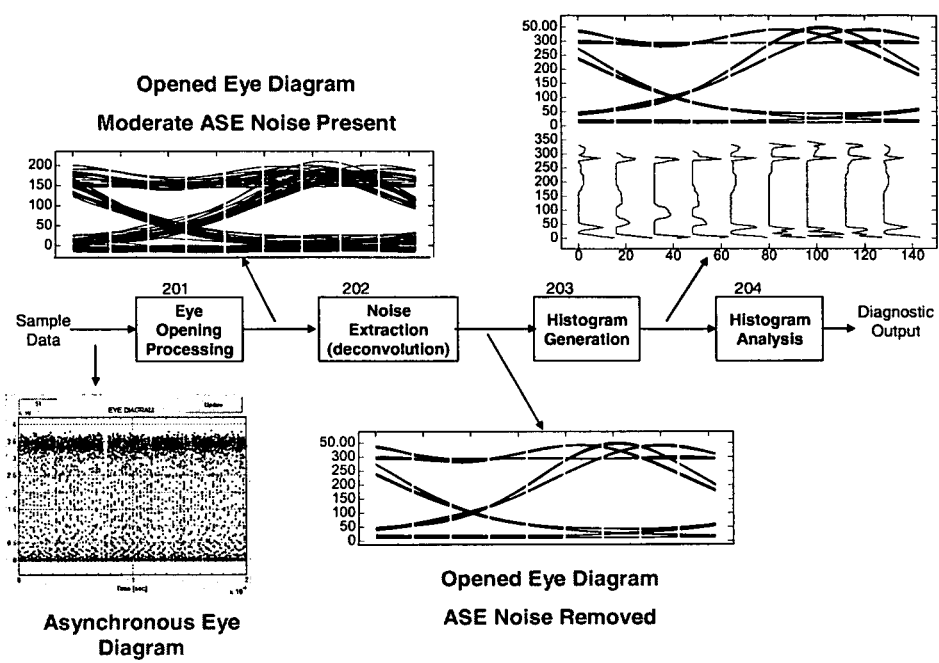
Figure 2 Detail of Sample Processing Function

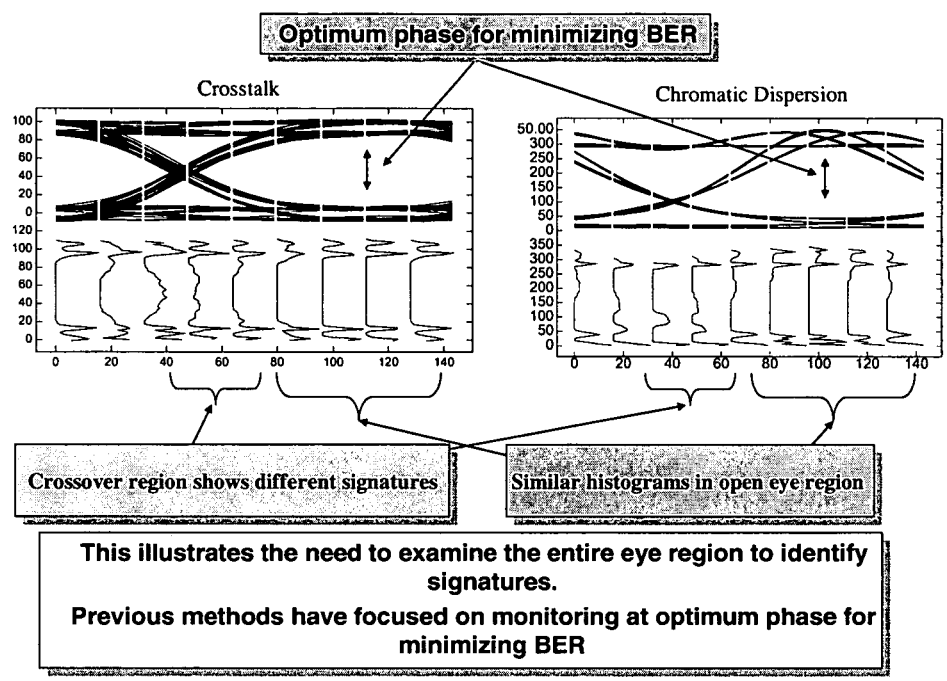
Figure 3 Comparison of Chromatic Dispersion and Crosstalk Eye Diagrams

METHODS AND SYSTEMS FOR OPTICAL PERFORMANCE MONITORING

FIELD OF THE INVENTION

The present invention relates generally to performance monitoring systems for wavelength division multiplexing transmission systems.

BACKGROUND OF THE INVENTION

The problem is to develop Optical Performance Monitors (OPMs) that take measurements of an optical channel digital signal that uses On-Off Keying (OOK) and determine if its performance (e.g., bit error ratio at the receiving end) has changed perceptively from a known baseline, and if so identify the type of optical impairment that has caused the change. The objective is to not only identify fault conditions and their cause, but to also identify small changes/trends (and their cause) that are precursors to fault conditions (thus allowing remedial action to be taken before a fault condition materializes). It is envisioned that OPMs would be used at multiple locations in order to localize the cause of faults, and precursors to faults. Such OPMs must be very low cost so that it is economic to deploy many of them in a network to enable the capability to localize and identify the sources of network performance problems.

Optical Performance Monitor (OPM) products exist today, but they have limited functionality that prevents them from identifying the cause of a network problem. Current products use what the ITU-T has defined in Rec. G.697 (Optical monitoring for DWDM Systems) as frequency domain (spectral) methods. Current OPM technology monitors optical channel power and total DWDM signal optical power, Optical Signal-to-Noise Ratio (OSNR), and optical channel wavelength. As indicated in G.697 (Sec. 6.1.2): "The fundamental property of these spectral methods is that they are averaging methods that, by definition, do not sense the pulse duration. This means that quality monitoring by spectral methods will be insensitive to all of the effects due to [pulse] distortions."

The current products are suitable for static point-point WDM systems, but are inadequate for dynamic WDM networks (in mesh, ring, or combined topologies). In dynamic WDM networks lightpath connections are frequently changed, and each time a change is made the performance on other existing light paths can change. OPMs are needed that can identify this change in performance and identify the type of new impairment or interference that has been introduced. Thus spectral techniques are not adequate. More sophisticated techniques that measure time domain signal properties (e.g., eye diagram analysis, Q-factor, etc.) can detect pulse distortion, but such capabilities are available today only in expensive test equipment (e.g., sampling oscilloscopes and Q-factor meters as described in ITU-T Rec. O.201).

The current OPM products use spectral techniques, which are incapable of identifying pulse distortion effects. There is also a significant research literature in this area that has identified various techniques for OPM capability (not currently in products). These reported techniques have limited ability to identify the type of impairment causing a change in performance (e.g., chromatic dispersion, polarization mode dispersion, cross-talk, etc.). One reason for this is that they have focused on measuring the error performance a receiver would see, and therefore they do their sampling at the optimal point in the eye diagram so they get a good estimate of BER. By looking at all parts of the eye diagram, as our method does, a wider view of impairment signatures is possible and thus better capabilities to identify specific impairments.

Prior published techniques have also not dealt with analyzing trends that may be precursors to fault conditions. Observing trends as well as identifying the impairment causing the changes can identify conditions leading up to a fault. One example is polarization mode dispersion (PMD), which is known to vary over time and will occasionally reach a point that causes a system outage. If an OPM could identify that performance was being degraded and PMD was the cause, then channels could be rerouted before the outage occurred.

BRIEF SUMMARY OF THE INVENTION

We have invented a method and system to economically monitor an optical OOK signal that can detect perceptible changes in signal quality and identify the type of optical impairment causing the change. Our invention requires a new and novel combination of known techniques to create an eye diagram of the transmitted pulse in a wavelength division multiplexing systems and then removing the noise from the eye diagram. The resulting "cleaner" eye diagram is then analyzed to identify any changes in performance. In our preferred embodiment, the analysis is conducted on histograms generated from eye diagram, the histograms are computed at a number of points across the optical signal pulse period.

BRIEF DESCRIPTION OF THE DRAWINGS

FIG. 1 is a block diagram of OPM.
FIG. 2 is a detail of sample processing function.
FIG. 3 is a comparison of chromatic dispersion and crosstalk eye diagrams.

DETAILED DESCRIPTION

FIG. 1 shows the functional block diagram of the OPM system. An internal clock (Block 104) is used to trigger the sampling instants. Each sampling "instant" is a short sampling interval of duration around $\frac{1}{100}^{th}$ the optical signal pulse period. The sampling pulse intervals from the internal clock are provided to an optical sampling device (Block 101) and the Sample Processing function (Block 103). The optical sampling function is an electro-absorption modulator that has high absorption (low output signal) outside a sampling pulse, and low absorption (measurable output signal) during a sampling pulse from the internal clock. During each sampling pulse, the output signal from the optical sampling function is sent to an Optical/Electrical (O/E) converter (an avalanche photo diode) to produce an electrical current proportional to the optical signal level during the sampling interval. The sample processing function (Block 103) records the value of each sample and its sample time. The Sample Processing function collects samples for some period of time, and then processes those samples as illustrated in FIG. 2.

The input data to the Sample Processing function is a collection of asynchronous samples (i.e., the sampling is not synchronized with the optical signal pulse rate). The time between samples (sampling interval) is held constant for the entire sampling period, and the sampling interval will span many pulse periods (e.g., >100) of the optical signal. If these asynchronous samples are plotted on an eye diagram, using the optical signal pulse period, an asynchronous eye pattern as shown in FIG. 2 is obtained. The first processing step (Block 201) is to open the eye diagram. This gives an opened eye diagram as shown in FIG. 2, and this data will contain signal plus Gaussian noise. The next processing step (Block 202) is Noise Extraction using deconvolution techniques. This gives a cleaner opened eye diagram as illustrated in FIG. 2. The techniques used in Blocks 201 and 202 are known, but combining them within an OPM is new.

The next step in sample processing is the generation of histograms for the opened eye diagram with noise removed. Histograms are computed at a number of points across the optical signal pulse period, as illustrated in FIG. 2. That set of histograms is then analyzed (Block 204) to identify any changes in performance (e.g., BER) and identify the impairments causing the changed performance. The important and new concept in this technique is that a set of histograms taken at phase points across the optical pulse period, and this set of histograms is used to characterize the signal quality and identify the type of impairments causing problems. Previous techniques have used a single histogram at the phase having the widest eye opening, and have been directed at estimating the BER and not identifying the type of impairments.

FIG. 3 illustrates how the impairment identification process works. Two eye diagrams and their histograms are shown, one system has crosstalk impairments and the other has chromatic dispersion. If histograms are only taken at the sampling phase yielding minimum BER (i.e., at maximum eye opening) the crosstalk and chromatic dispersion histograms look very similar. However, looking at the phase points showing the rise and fall edges of the pulses can identify a clear indication of the type of impairment, as illustrated in FIG. 3.

Prior techniques have used a single histogram for an asynchronous eye diagram or used eye opening techniques on asynchronous samples to estimate BER. The histogram for asynchronous eye diagrams is typically used to estimate the Q factor (a measure of BER) and has very limited capability to identify impairment signatures. The eye opening techniques are directed at estimating the Q factor and BER and thus only look at the widest opening of the eye; thus they have limited value in identifying signatures of impairments. Our solution:
(1) Combines eye opening techniques with noise extraction capabilities (e.g., deconvolution) to obtain open asynchronous eye diagrams without added noise; no other technique does this combined analysis.
(2) Uses a set of histograms across the opened asynchronous eye diagram to identify impairment signatures; other techniques use a single histogram, which gives very limited capability to identify impairment signatures.
(3) Uses asynchronous sampling to achieve a low cost OPM capability. Synchronous sampling requires clock and data recovery (CDR) circuitry, which increases costs significantly. Also, synchronous sampling requires high speed circuitry, which also increases costs. Asynchronous sampling avoids these expensive high speed electronic capabilities. Synchronous sampling is only appropriate for expensive test equipment and sampling oscilloscopes.

Previous work on OPM has been primarily concerned with estimating the BER that would be seen at the receiver of an optical system. Thus, in eye diagram analysis, the attention has been on techniques to estimate the Q factor, which involves looking at where the eye is open and the receiver would have the lowest BER. Our techniques are directed at identifying changes in performance and identifying the type of impairment causing the change. Thus, we were motivated to look at the properties of the entire eye diagram and not just at where the receiver would be collecting data.

Previous techniques have focused on looking at a single histogram, either one generated from the asynchronous samples or using eye opening techniques and looking at the histogram for the open part of the eye. Because of their focus on BER measurements, they were not motivated to generate multiple histograms across the eye pattern.

The combined use of eye opening techniques and deconvolution to extract noise is also new. Previous studies did not consider this due to a focus on BER considerations, which led to examining the widest opening of the eye.

We have developed a simulation model using the RSOFT simulation package. So far we have focused on modeling chromatic dispersion, polarization mode dispersion and crosstalk. We have developed some signature patterns for the different impairment types. FIG. 3 shows an example of signatures for chromatic dispersion and crosstalk.

What is claimed is:

1. A method comprising:
   sampling, with a monitoring device, an optical signal from an optical transmission system;
   generating an eye diagram based at least in part on the sampling of the optical signal;
   generating a set of at least two histograms based at least in part on the eye diagram; and
   identifying a change in performance of the optical transmission system based at least in part on the set of histograms.

2. The method of claim 1, further comprising identifying a type of optical impairment as a potential cause of the change in performance of the optical transmission system.

3. The method of claim 2, wherein the optical impairment comprises at least one of a crosstalk impairment or a chromatic dispersion.

4. The method of claim 1, further comprising:
   analyzing the change in performance of the optical transmission system; and
   identifying a precursor to a fault condition of the optical transmission system based at least in part on the analysis.

5. The method of claim 1, wherein the optical signal is sampled for a duration of around 0.01 of an optical signal pulse period of the optical signal.

6. The method of claim 1, further comprising producing an electrical current that is proportional to a sample of the optical signal.

7. The method of claim 1, wherein the optical signal is sampled asynchronous relative to an optical signal pulse rate of the optical signal.

8. The method of claim 1, further comprising using a deconvolution technique to remove noise from the eye diagram.

9. The method of claim 1, further comprising generating a clean eye diagram at least in part by removing noise from the eye diagram, wherein the set of at least two histograms is generated based at least in part on the clean eye diagram.

10. The method of claim 1, wherein the set of at least two histograms are taken at a plurality of phase points across an optical pulse period of the optical signal.

11. The method of claim 10, wherein the plurality of phase points correspond at least to a rise edge and a fall edge of the optical signal within the optical pulse period.

12. An apparatus comprising:
   an internal clock configured to generate an internal clock signal; and
   a processor operatively coupled to the internal clock and configured to:
     trigger sampling of an optical signal from an optical transmission system based at least in part on the internal clock signal;
     generate an eye diagram based at least in part on the sampling of the optical signal;

generate a set of at least two histograms based at least in part on the eye diagram; and identify a change in performance of the optical transmission system based at least in part on the set of histograms.

13. The apparatus of claim 12, further comprising an optical/electrical converter operatively coupled to the processor and configured to produce an electrical current that is proportional to a sample of the optical signal.

14. The apparatus of claim 13, wherein the optical/electrical converter comprises an avalanche photo diode.

15. The apparatus of claim 12, wherein the sampling of the optical signal is performed at a sampling interval having a duration of about 0.01 of an optical signal pulse period of the optical signal.

16. The apparatus of claim 12, wherein the processor is further configured to identify a type of optical impairment as a potential cause of the change in performance of the optical transmission system.

17. The apparatus of claim 12, wherein the processor is further configured to analyze the change in performance of the optical transmission system to identify a precursor to a fault condition of the optical transmission system.

18. The apparatus of claim 12, wherein the set of at least two histograms are taken at a plurality of phase points across an optical pulse period of the optical signal.

19. The apparatus of claim 18, wherein the plurality of phase points correspond at least to a rise edge and a fall edge of the optical signal.

\* \* \* \* \*

UNITED STATES PATENT AND TRADEMARK OFFICE
CERTIFICATE OF CORRECTION

| | | |
|---|---|---|
| PATENT NO. | : 8,625,986 B2 | Page 1 of 1 |
| APPLICATION NO. | : 11/527618 | |
| DATED | : January 7, 2014 | |
| INVENTOR(S) | : Skoog et al. | |

It is certified that error appears in the above-identified patent and that said Letters Patent is hereby corrected as shown below:

On the Title Page, in item (56), under "OTHER PUBLICATIONS", in Column 2, Line 3, delete "Institut" and insert -- Institute --, therefor.

On Title Page 2, in item (56), under "OTHER PUBLICATIONS", in Column 1, Line 2, delete "Amplitud" and insert -- Amplitude --, therefor.

On Title Page 2, in item (56), under "OTHER PUBLICATIONS", in Column 1, Lines 8-10, delete "N. Hanik et al "Application of Amplitude histograms to monitor performance of optical channels" Mar. 4, 1999, Electronic Letters, vol. 3, No. 5., pp. 403-404.*".

On Title Page 2, in item (56), under "OTHER PUBLICATIONS", in Column 1, Line 13, delete "Measurment" and insert -- Measurement --, therefor.

On Title Page 2, in item (56), under "OTHER PUBLICATIONS", in Column 2, Lines 7-10, delete "H. Chen et al., "Transparent Monitoring of Rise Time Using Asychronous Amplitude Histograms in Optical Transmission Systems," Journal of Lightwave Technology, vol. 22, No. 7, Jul. 2004, pp. 1661-1667.".

In the Specification

In Column 1, Line 39, delete "that." and insert -- that, --, therefor.

Signed and Sealed this
Twenty-second Day of July, 2014

Michelle K. Lee
*Deputy Director of the United States Patent and Trademark Office*